Oct. 16, 1956 P. H. MacMAHON 2,767,391
SIGNALLING DEVICES
Filed Sept. 12, 1952 2 Sheets-Sheet 1
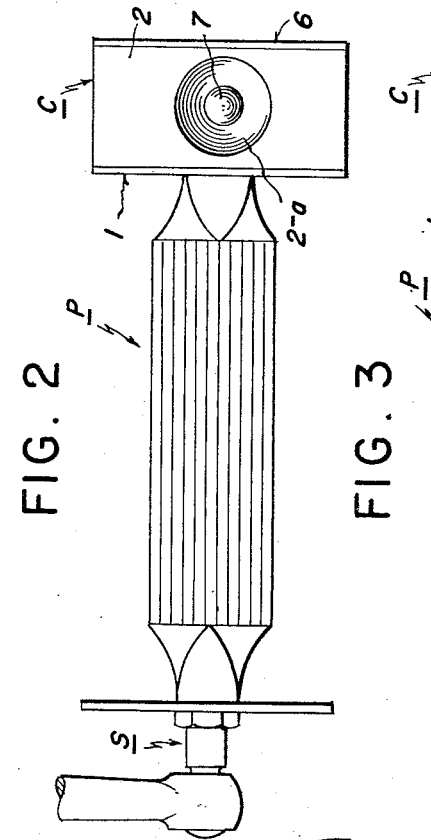
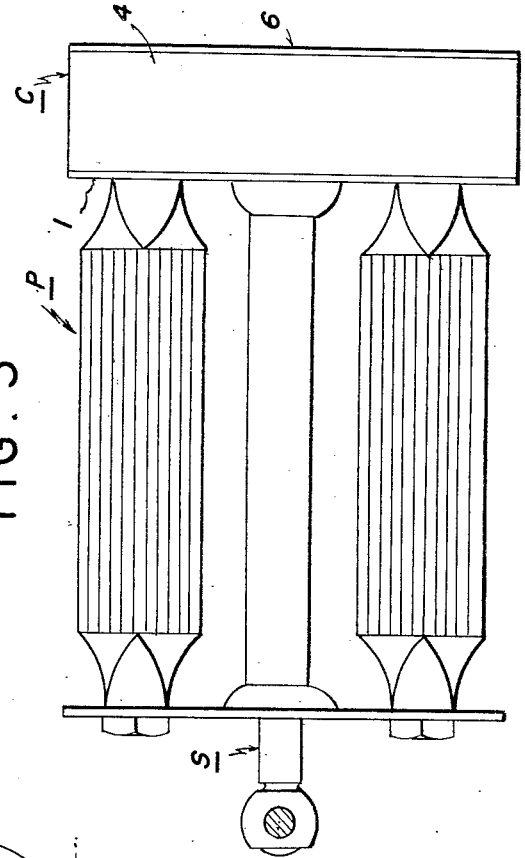
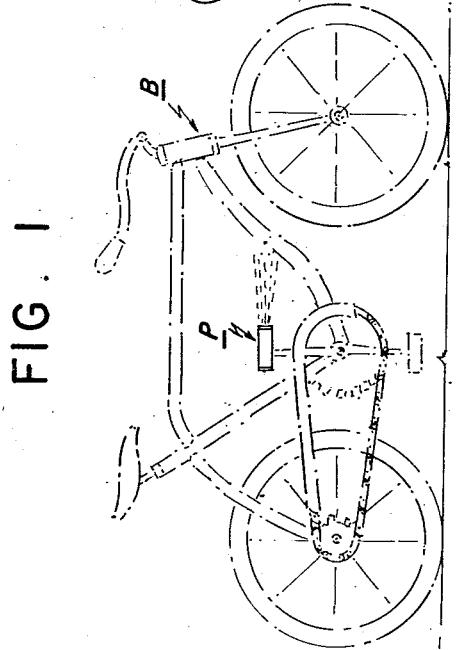
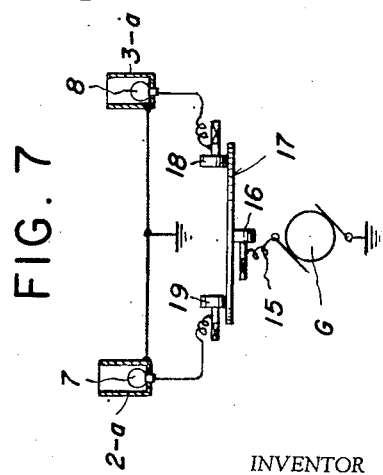
INVENTOR
Paul H. Mac Mahon,
BY *Ogle R. Singleton*
ATTORNEY Oct. 16, 1956 P. H. MacMAHON 2,767,391
SIGNALLING DEVICES
Filed Sept. 12, 1952 2 Sheets-Sheet 2

INVENTOR
Paul H. MacMahon
BY Ogle R. Singleton
ATTORNEY

United States Patent Office 2,767,391
Patented Oct. 16, 1956

2,767,391

SIGNALLING DEVICES

Paul H. MacMahon, Alexandria, Va.

Application September 12, 1952, Serial No. 309,196

6 Claims. (Cl. 340—81)

My invention consists in a new and useful improvement in signalling devices and is designed for displaying a white and a red light fore and aft, respectively, on a bicycle during its travel. The particularly novel and useful feature of my improved device is the combination of a pair of electric lamps, for displaying a white and a red light, respectively, which are mounted on one of the pedals of the bicycle, with a generator of electric current, carried by the pedal and actuated by rotation of the pedal-carrying shaft relative to the pedal, when the bicycle is being driven by its pedals. Another valuable feature of my improved device is the novel means provided for opening and closing the electrical circuits connecting the generator with the lamps whereby the device produces flashing lights.

While I have illustrated in the drawing and hereinafter fully described one specific embodiment of my invention, it is to be distinctly understood that I do not consider my invention to be limited to said specific embodiment, but refer for its scope to the claims appended hereto.

In the drawing:

Fig. 1 is a perspective of a bicycle equipped with my improved signalling device.

Fig. 2 is a front elevation of the pedal carrying the device.

Fig. 3 is a top plan of the pedal.

Fig. 7 is a diagram showing the electric circuits.

Figure 4:
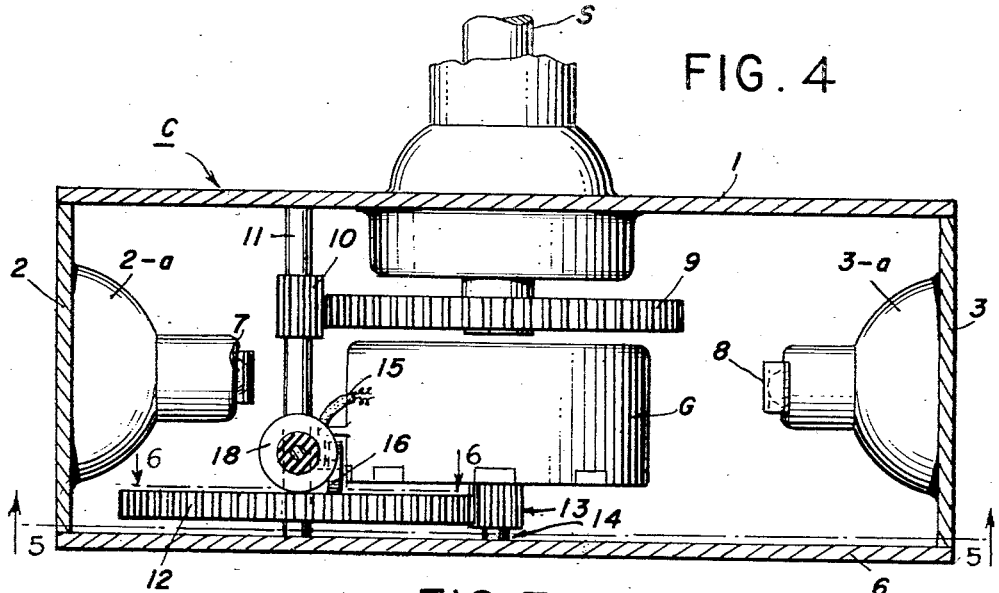
Fig. 4 is a horizontal section on the line 4—4 of Fig. 5, in the direction of the arrows.

As illustrated in the drawing my improved device is contained in a case C suitably mounted on the pedal P of a bicycle B which is journaled on a pedal-carrying shaft S. The case C has an inner wall 1 carried by the pedal P, end walls 2 and 3, a top wall 4, a bottom wall 5 and a front wall 6 which is removably mounted on the walls 1 to 5. The end walls 2 and 3 have sockets 2-a and 3-a, respectively, in which are mounted a white electric lamp 7 and a red electric lamp 8. It is to be understood that one of the contacts of each bulb is grounded through the socket in which the bulb is mounted (Fig. 7).

It will be noted (Fig. 4) that the shaft S extends into the casing C and has on its end a gear 9 meshing with a pinion 10 on a shaft 11 rotatably mounted in walls 1 and 6, and carrying a gear 12. Gear 12 may be mounted on shaft 11 by means of a suitable ratchet and dog connection, to provide a "one-way" drive. Gear 12 meshes with a pinion 13 on a shaft 14 journaled in wall 6. This shaft 14 has mounted thereon the armature (not shown) of a suitable electric generator G.

It is to be understood that one of the contacts (Fig. 7) of the generator G is grounded through the support G-1 for the generator G mounted on wall 5 of the case C. The other contact of the generator G is electrically connected by a conductor 15 with a roller 16 suitably mounted adjacent gear 12. The gear 12 has mounted thereon a contact plate 17 against which roller 16 bears for electrical contact therewith.

Two rollers 18 and 19 are suitably mounted on walls 4 and 5, respectively, and electrically connected with the other contacts of bulbs 7 and 8, respectively (Fig. 7). The rollers 18 and 19 are so mounted relative to contact plate 17 as to bear thereon for electrical contact.

It is to be understood that rollers 16, 18 and 19 and their connections with the generator G and bulbs 7 and 8 are properly insulated to prevent grounding.

Figure 5:
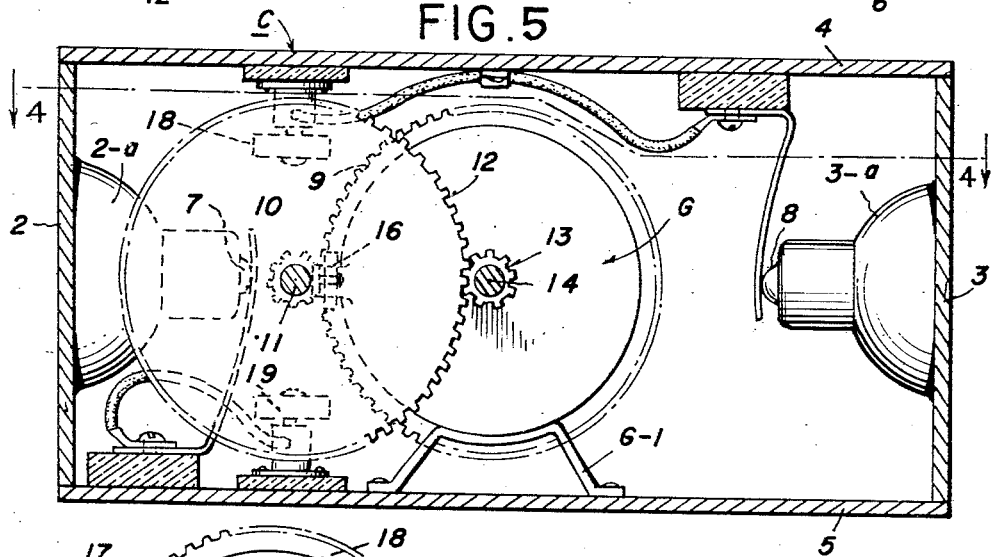
Fig. 5 is a vertical section on the line 5—5 of Fig. 4, in the direction of the arrows.
Figure 6:
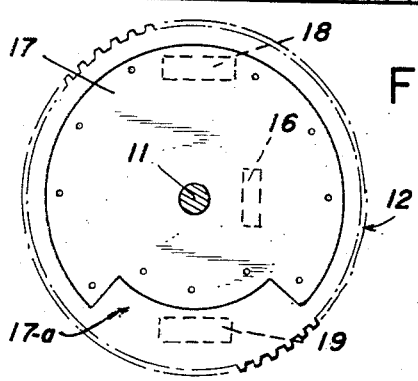
Fig. 6 is a vertical section on the line 6—6 of Fig. 1, in the direction of the arrows.

It will be noted (Fig. 6) that plate 17 is mutilated to provide a "dead" space 17-a which, when the plate 17 is rotated, breaks the circuits from the generator G to the lamps 7 and 8 thereby causing them to flash. It will also be noted that due to the diametrical positions of the rollers 18 and 19 (Fig. 5) the lamps flash alternately.

From the foregoing description of the details of construction of my improved device its operation will be obvious. When the bicycle B is being driven by pressure on the pedal P exerted by the rider, the shaft S is rotated relative to the pedal P, and consequently relative to casing C on the pedal, thereby driving the above-described gear train to actuate the generator G, the current from which is transmitted through the above-described circuits to light lamps 7 and 8.

Having described my invention, what I claim is:

1. In a signalling device for a bicycle having a pedal-carrying shaft and a pedal journaled on said shaft, said shaft and pedal moving in a circular orbit when the bicycle is propelled by the pedal, and said shaft rotating relative said pedal, the combination of an electric lamp on the pedal; an electric generator on the pedal; an electric circuit connecting said lamp and said generator; and means journaled in the pedal and actuated by rotation of the shaft relative to the pedal, adapted to actuate said generator.

2. In a signalling device for a bicycle having a pedal journaled on a pedal-carrying shaft, said shaft and pedal moving in a circular orbit when the bicycle is propelled by the pedal, and said shaft rotating relative said pedal, the combination of two electric lamps on the pedal; an electric generator on the pedal; two electric circuits connecting said lamps with said generator; means actuated by rotation of said shaft for actuating said generator; and other means operated by rotation of the shaft relative to the pedal, adapted to control said circuits, to cause said lamps to flash alternately.

3. In a signalling device, the combination of a casing adapted to be moved in a circular orbit; a shaft adapted to be moved in said orbit, and on which said casing is journaled, said shaft being rotated in said casing by said movement; an electric lamp in said casing, having one of its contacts grounded on said casing; an electric generator in said casing, having one of its contacts grounded on said casing; means adapted to actuate said generator by rotation of said shaft; a roller electrically connected with the other contact of said lamp; a roller electrically connected with the other contact of said generator; and a contact plate having a cut-out portion, rotated by said shaft, the generator-connected roller being in constant electric contact with said plate, and the lamp-connected roller being in intermittent contact with said plate, due to said cut-out portion.

4. In a signalling device, the combination of a casing adapted to be moved in a circular orbit; a shaft adapted to be moved in said orbit, and on which said casing is journaled, said shaft being rotated in said casing by said movement; two electric lamps in said casing, each lamp having one of its contacts grounded on said casing; an electric generator in said casing, having one of its contacts grounded on said casing; a roller electrically connected with the other contact of said generator; a pair of rollers electrically connected with the other contacts of said lamps, respectively; and a contact plate rotated by said shaft, said generator-connected roller being in constant electrical contact with said plate, said plate having a cut-out portion, said lamp-connected rollers being in intermittent electric contact with said plate, due to said cut-out portion.

5. In a signalling device for a bicycle having a pedal-carrying shaft and a pedal journaled on said shaft, said shaft and pedal moving in a circular orbit when the bicycle is propelled by the pedal, and said shaft rotating relative said pedal, the combination of an electric lamp on said pedal, having one of its contacts grounded on said pedal; an electric generator on said pedal, having one of its contacts grounded on said pedal; means adapted to actuate said generator by rotation of said shaft; a roller journaled on said pedal and electrically connected with the other contact of said lamp; a roller journaled on said pedal and electrically connected with the other contact of said generator; and a contact plate, having a cut-out portion, rotated by said shaft, the generator-connected roller being in constant electrical contact with said plate, and the lamp-connected roller being in intermittent electrical contact with said plate, due to the cut-out portion.

6. In a signalling device for a bicycle having a pedal journaled on a pedal-carrying shaft, said shaft and pedal moving in a circular orbit when the bicycle is propelled by the pedal, and said shaft rotating relative said pedal, the combination of two electric lamps on said pedal, each lamp having one of its contacts grounded on said pedal; an electric generator on said pedal, having one of its contacts grounded on said pedal; means adapted to actuate said generator by rotation of said shaft; a roller journaled on said pedal and electrically connected with the other contact of said generator; a pair of rollers journaled on said pedal and electrically connected with the other contacts of said lamps, respectively; and a contact plate rotated by said shaft, said generator-connected roller being in constant electrical contact with said plate, said plate having a cut-out portion, and said lamp-connected rollers being in intermittent electrical contact with said plate, due to said cut-out portion.

References Cited in the file of this patent

UNITED STATES PATENTS

| | | |
|---|---|---|
| 1,228,263 | Topping | May 29, 1917 |
| 1,928,873 | Acton | Oct. 3, 1933 |
| 2,079,153 | Cote | May 4, 1937 |
| 2,090,805 | Oliver | Aug. 24, 1937 |
| 2,170,088 | Murray, et al. | Aug. 22, 1939 |
| 2,185,600 | McComb | Jan. 2, 1940 |
| 2,256,794 | Schwab | Sept. 23, 1941 |
| 2,390,877 | Fisher | Dec. 11, 1945 |
| 2,394,296 | Farrell | Feb. 5, 1946 |
| 2,505,154 | Smith | Apr. 25, 1950 |
| 2,561,131 | Oropeza | July 17, 1951 |
| 2,576,934 | Grier | Dec. 4, 1951 |
| 2,603,701 | Schadel, Jr. | July 15, 1952 |
| 2,661,406 | Callan | Dec. 1, 1953 |